United States Patent [19]

Thom

[11] 4,344,719
[45] Aug. 17, 1982

[54] INTERNALLY EXPANDING RAILING COUPLING

[75] Inventor: Wenzel W. Thom, Wichita, Kans.

[73] Assignee: Architectural Art Mfg., Inc., Wichita, Kans.

[21] Appl. No.: 171,708

[22] Filed: Jul. 24, 1980

[51] Int. Cl.³ .............................................. F16D 1/00
[52] U.S. Cl. .................................... 403/297; 403/374
[58] Field of Search ...................... 403/297, 366, 374; 248/212, 213

[56] References Cited

U.S. PATENT DOCUMENTS

| | | | |
|---|---|---|---|
| 734,509 | 7/1903 | Caesar | 248/188.5 |
| 1,545,115 | 7/1925 | Amsden | 248/411 |
| 1,884,497 | 10/1932 | Abbott | 248/411 |
| 2,192,048 | 2/1940 | Mueller | 403/297 |
| 2,850,304 | 9/1958 | Wagner | 403/297 X |
| 2,997,317 | 8/1961 | Scott | 403/297 X |
| 3,195,923 | 7/1965 | Moulton | 403/297 X |
| 3,514,135 | 5/1970 | Cooper | 403/297 X |
| 4,102,529 | 7/1978 | Neblung | 403/297 X |

Primary Examiner—Andrew V. Kundrat
Attorney, Agent, or Firm—Edward L. Brown, Jr.

[57] ABSTRACT

An internal expanding coupling for pipe railing including a slotted sleeve member positioned inside two abutted railing sections with a wedging member positioned within the slot for expanding the sleeve outwardly against the railing sections in a locking joint as the wedge member is drawn against the railing sections.

7 Claims, 4 Drawing Figures

INTERNALLY EXPANDING RAILING COUPLING

BACKGROUND OF THE INVENTION

The invention relates to coupling devices for tubular railing which are internally expanded to lock the railing sections together.

There are numerous prior art methods for achieving such a coupling, as shown in the following patents:
  U.S. Pat. No. 3,514,135 to Cooper
  U.S. Pat. No. 2,850,304 to Wagner
  U.S. Pat. No. 2,997,317 to Scott
  U.S. Pat. No. 4,102,529 to Neblung.

Most of these patents, such as the Cooper and Scott patents, utilize a locking screw which levers the coupling sleeve against itself to expand the sleeve, while in the present invention the wedging means, which expands the sleeve, is drawn to the railing section itself. With the coupling of the present invention, not only does the expanded sleeve provide a friction locking joint against the inside diameter of the rail section, but also the two locking screws in conjunction with the wedge member provide a secondary lap joint for any tensile loadings. The heads of the locking screws are always in a flush position with the rail sections, regardless of the degree of tightening on the wedge member. The wedging member of the present invention includes an indexing groove which assists in aligning and assembling the coupling. The wedging member also includes a tab arrangement on the ends thereof for maintaining the sleeve and wedge member as a unitary structure in the unassembled state.

DESCRIPTION OF THE INVENTION

The present invention relates generally to railing systems, and pertains more specifically to an expandable coupling utilized between two abutted sections of pipe railing structure.

The railing system is a flush-fit tubular aluminum freestanding system held together at abutted joints by an internally expanding coupling whose fastening screws are flush-mounted in the bottom of the rail.

It is therefore the principal object of the present invention to provide a prefabricated pipe railing system which is easily erected on the building site from a minimum number of component parts to provide a railing of substantial strength with a clean aesthetic appearance.

Another object of the present invention is to provide a railing system which is readily installed with conventional tools and requires a minimum skill level for the installation workers.

A further object of the present invention is to provide a railing coupling with increased strength without affecting the overall appearance of the railing.

Other objects and advantages of the present invention will become more readily apparent from the examination of the following specification taken in conjunction with the accompanying drawings and claims wherein:

DESCRIPTION OF THE PREFERRED EMBODIMENT

Figure 1:
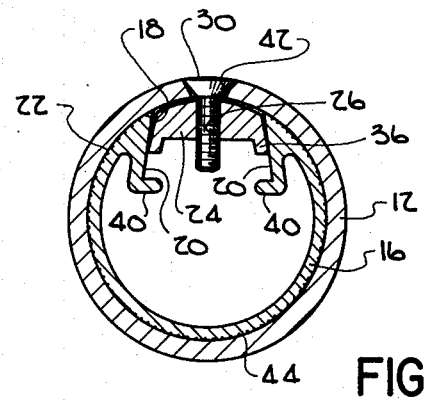
FIG. 1 is a sectional view of the coupling taken along lines 1—1 of FIG. 2.
Figure 2:
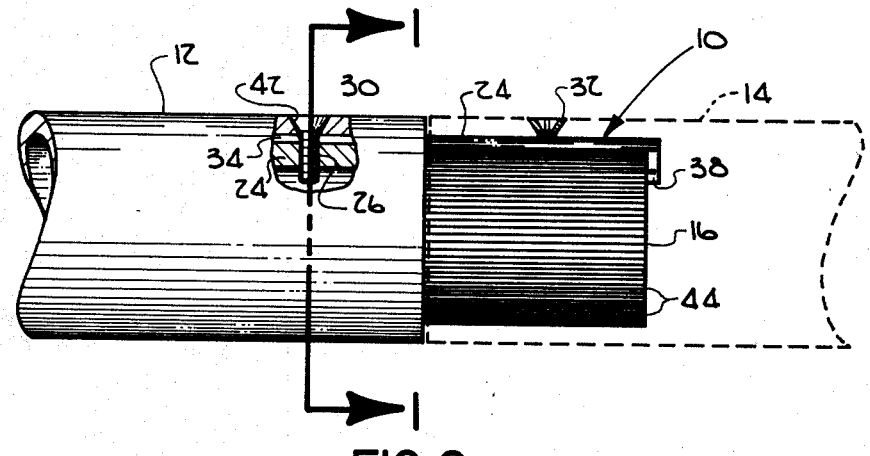
FIG. 2 is a partial section of a railing joint illustrating the coupling partially in elevation and in section.
Figure 3:
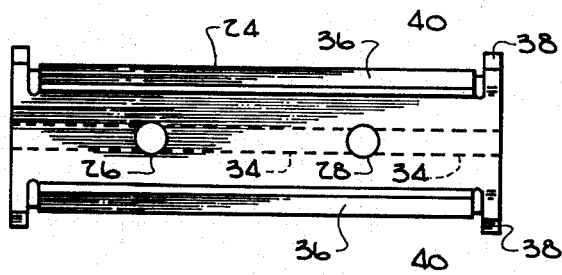
FIG. 3 is a partial bottom view of the wedging member of the coupling.
Figure 4:
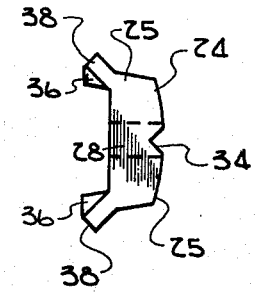
FIG. 4 is an end elevational view of the wedging member.

Referring now to the drawings, and more specifically to FIG. 2, the coupling generally referred to by reference numeral 10, is illustrated between two tubular railing sections 12 and 14. Coupling 10 includes a sleeve member 16 having a longitudinal slot 18 running the full length thereof (as best seen in FIG. 1). Slot 18 is formed by a pair of camming surfaces 20 which diverge as they extend inwardly from the outer circumference 22 of the sleeve. Positioned in the slot 18 is a wedging member 24 with a mating pair of camming surfaces 25 (FIG. 4). Equally spaced from the ends of the wedge member 24 are a pair of lateral threaded openings 26 and 28 for receipt of fastening screws 30 and 32, respectively. Longitudinally positioned down the center of wedge member 24 is a groove 34, as best seen in FIGS. 3 and 4, which intersects the centers of both threaded openings 26 and 28. As viewed in FIGS. 1 and 4, the camming surfaces 25 of the wedging member are extended by a pair of short legs 36 on each side of the wedging member 24. The outer extremities of legs 36 are deformed outwardly to form a pair of tabs 38, as seen in FIGS. 3 and 4. Tabs 38 are first formed by making a lateral cut 40 approximate the ends of legs 36, as shown in FIG. 3. The purpose of tabs 38 is to longitudinally retain wedge member 24 within sleeve member 16. This is achieved in the assembly process of the coupling by first placing the wedging member within the camming surfaces 20 of the sleeve and then bending the tabs 38 outwardly to prevent any longitudinal movement. Located at the inner extremity of camming surfaces 20 are a pair of inwardly turned flanges 40, which prevent the wedge member 24 from escaping the confines of camming surfaces 20.

Located at the end of each tubular rail section 12 is a countersunk lateral opening 42, having a mated shape with the head of screw 30. Openings 42 are precisely located from the end of rail section 12 a distance of one-half the distance between openings 26 and 28 on wedge member 24 so that the openings in two abutting rail sections and the wedge member will be in alignment when the coupling is assembled. Located around the outer circumference of sleeve 16 are a plurality of serrations 44 which run longitudinally on the sleeve, as can be seen in FIGS. 1 and 2. These serrations provide a gripping action on the inside diameter of rail section 12 when the sleeve is expanded.

Coupling 10 in its unassembled condition includes both sleeve 16 and wedge member 24 which are held together by outwardly turned tabs 38, even though wedge member 24 freely slips back and forth within the confines of camming surfaces 20.

ASSEMBLY OF A RAILING JOINT

Coupling member 10 is first inverted into rail section 12 with the coupling aligned so that groove 34 passes under openings 42 in the rail section. The coupling 10 is inserted until openings 26 and 42 aligns at which time screw 30 is loosely threaded into wedge member 24 through rail section 12. The second rail section 14 is then slid over the other end of sleeve 16 and aligned so that groove 34 passes under the opening 42 in rail section 14. As the rail sections 12 and 14 come into abutting contact, threaded opening 28 in wedge member 24 will come into alignment with opening 42 in rail section 14. As screws 30 and 32 are threaded into wedge member 24, the wedge member expands sleeve 16 due to the converging cam surfaces 20.

Screws 30 and 32 are tightened until wedging members are drawn into abutting contact with the inside diameter of rail sections 12 and 14. The action of wedging member 24 not only expands the serrations 44 into locking engagement with the two rail sections, but also provides a lap joint with the two screws 30 and 32 fastening the rail sections 12 and 14 directly to the wedge member 24. This lap joint provides increased tensile strength to the coupling while at the same time expanding the coupling sleeve to provide a rigid joint with respect to any bending or torsional loads.

Having described the invention with sufficient clarity to enable those familiar with the art to construct and use it, I claim:

1. An internal expanding coupling for tubular pipe railing comprising:

a pair of tubular rail sections abutted end-to-end, each including a lateral opening spaced inwardly from the ends thereof;

coupling means comprising a sleeve member inserted in the ends of each rail section, a longitudinal slot extending the length of the sleeve member, a pair of camming surfaces on said sleeve adjacent the slot converging toward and terminating in the outer diameter of the sleeve;

wedge means having threaded openings therein positioned between said camming surfaces for spreading the sleeve member and locking the sleeve member and pipe sections together; and screw fastening means passing through said lateral openings in each rail section and engageable with the threaded openings in the wedge means to draw the wedge means and pipe sections together creating a rigid joint.

2. An internal expanding coupling as set forth in claim 1, wherein the wedge means includes a longitudinal reference groove aligned with the centers of each threaded opening, to assist in assembling the coupling.

3. An internal expanding coupling as set forth in claim 1, wherein the wedge means includes outwardly turned tabs on each end thereof to prevent the wedge means from sliding longitudinally in the sleeve member.

4. An internal expanding coupling as set forth in claim 1, wherein the camming surfaces face each other and include extending shoulders on the inner ends thereof limiting inward movement of the wedge means.

5. An internal expanding coupling as set forth in claim 1, wherein the lateral openings in the rail sections are countersunk with a mating head on the fastening means to provide a flush-mounted surface.

6. An internal expanding coupling as set forth in claim 1, wherein the outer diameter of the sleeve member includes longitudinal serrations for gripping the inside diameter of the rail section.

7. An internal expanded coupling as set forth in claim 1, wherein the lateral openings are equally spaced from the ends of said rail sections a distance which is one-half the distance between the centers of the threaded openings in the wedge means.

* * * * *